United States Patent [19]

Kawamura et al.

[11] Patent Number: 4,969,984
[45] Date of Patent: Nov. 13, 1990

[54] EXHAUST GAS TREATMENT PROCESS USING IRRADIATION

[75] Inventors: Keita Kawamura, Kanagawa, Japan; Shinichi Hirano, Greensburg, Pa.

[73] Assignee: Ebara Corporation, Tokyo, Japan

[21] Appl. No.: 363,796

[22] Filed: Jun. 9, 1989

Related U.S. Application Data

[63] Continuation-in-part of Ser. No. 243,134, Sep. 9, 1988, abandoned, which is a continuation of Ser. No. 55,969, Jun. 1, 1987, abandoned.

[51] Int. Cl.$^5$ .............................................. B01J 19/08
[52] U.S. Cl. .............................. 204/157.3; 204/157.46; 204/157.49; 204/158.2
[58] Field of Search ........... 204/157.3, 157.46, 157.49, 204/158.2

[56] References Cited

U.S. PATENT DOCUMENTS

| | | | |
|---|---|---|---|
| 3,984,296 | 10/1976 | Richards | 204/157.3 |
| 4,097,349 | 6/1978 | Zenty | 204/157.3 |
| 4,146,450 | 3/1979 | Araki | 204/157.3 |
| 4,294,674 | 10/1981 | Aoki | 204/157.3 |

Primary Examiner—John F. Niebling
Assistant Examiner—Ben C. Hsing
Attorney, Agent, or Firm—Armstrong, Nikaido, Marmelstein, Kubovcik & Murray

[57] ABSTRACT

In an exhaust gas treatment process, the exhaust gas is first irradiated in the presence of ammonia to produce particulates, and is then fed into an electrostatic precipitator and then to a mechanical filter device, whereby the treated effluent gas released into the atmosphere is caused to satisfy the relevant dust regulation values in addition to being substantially free of $SO_x$ and $NO_x$.

3 Claims, 5 Drawing Sheets

10 μm

EXHAUST GAS TREATMENT PROCESS USING IRRADIATION

This invention is a application of U.S. Ser. No. 07/243,134 filed on Sept. 9, 1988, now abandoned, which is a continuation of prior application U.S. Ser. No. 07/055,969 filed on June 1, 1987, now abandoned.

BACKGROUND OF THE INVENTION

1. Field of the Invention

This invention relates to a process for removing noxious ingredients from an exhaust gas containing $SO_x$ and/or $NO_x$ by adding ammonia to the exhaust gas and irradiating the exhaust gas with ionizing radiation or ultraviolet light.

2. Description of Prior Art

It is well known to add a certain amount of ammonia necessary to remove noxious ingredients to an exhaust gas containing noxious ingredients such as $SO_x$ and/or $NO_x$ and to treat the gas with irradiation in order to allow the noxious ingredients to be collected as ammonium sulphate and/or ammonium nitrate. In this process, it has been proposed that an electrostatic precipitator or a bag filter such as a dust collecting filter or the like may be used individually or in combinations thereof to collect particles of ammonium sulphate or ammonium nitrate.

The quantity of ammonia added is calculated on the basis of the quantity of exhaust gas and the concentration of $SO_x$ and/or $NO_x$ contained therein.

$$\text{Quantity of NH}_3 \text{ addition} = K\,Q[(NO_x) + 2(SO_x)]$$

In the above equation, K is an ammonia addition constant and is determined in accordance with the desulphurization efficiency and denitration efficiency. For example, in the case of both the denitration and desulphurization efficiency being 100%, K is 1. Q is the quantity of exhaust gas, $(NO_x)$ is the entrance $NO_x$ concentration and $(SO_x)$ is the entrance $SO_x$ concentration.

If a sudden change occurs in the concentration of $SO_x$ and/or $NO_x$ due to a change in the operating conditions of the exhaust gas generator, the higher is the concentration of $SO_x$ and/or $NO_x$ and the desulphurization efficiency and/or denitration efficiency, the greater is the required quantity of ammonia to be added. Therefore, the absolute amount of ammonia added is increased in order to follow this change. Consequently, under certain operating conditions, there may be cases which fail to satisfy the conditions required for an exhaust gas treatment apparatus, such as a reduction the noxious ingredient removal rate, or leakage of excess ammonia to the outside, or the like.

As an actual example, where the entrance $SO_x$ concentration is 1000 ppm and the entrance $NO_x$ concentration is 200 ppm, from the above equation 2200 ppm of ammonia is needed in order to collect all the noxious ingredients as ammonium sulphate and ammonium nitrate. If the desulphurization efficiency and the denitration efficiency are respectively 90%, the theoretical quantity of ammonium becomes about 1980 ppm. In other words, the quantity of ammonia to be added is about 1980–2200 ppm when the desulphurization efficiency and the denitration efficiency are between 90 and 100%, respectively, thereby causing a difference of 220 ppm. Further, if the entrance $SO_x$ concentration increases to 2000 ppm the quantity of ammonia to be added must be increased to about 3780 ppm to achieve a desulphurization efficiency and denitration efficiency of 90%. Then, due to the time taken for the exhaust gas to reach this exhaust gas treatment apparatus from the boiler as well as the response time of the $SO_x$ and $NO_x$ detector, the volume of unreacted $SO_x$ and $NO_x$ increases and there will be cases that the apparatus fails to achieved what is required of it as an environment protection apparatus.

The requisite capability of an environmental protection apparatus differs with the various environmental conditions. However, such minimum levels of efficiency as a desulphurization efficiency of 90% or more, a denitration efficiency of 80% or more and a maximum ammonia leakage rate of 10–50 ppm are ordinarily desired.

Moreover, since the ammonium sulphate and/or ammonium nitrate generated by irradiation treatment after the addition of ammonia to the reactor are in the form of very small, powder-like, particles and have a high adhesivity and hygroscopicity, careful consideration must be given to the selection of a dust collector. In the prior art, it has been proposed that an electrostatic precipitator or a bag filter be used as a dust collector individually or in a combination thereof. The particles collected as ammonium sulphate and ammonium nitrate have a specific character which causes the particles to condense with each other to form larger particles and having a high degree of adhesivity. Therefore, in the case of a filtering dust collector such as a bag filter, since the filtering resistance will increase in a short period of time, various modifications have to be provided, such as an extremely large filtering area or the injection of diatomaceous earth or clay or the like within the exhaust gas in front of the bag filter. These modifications increase both the installation and operating costs and are not desirable.

Unlike with a bag filter, in an electrostatic precipitator there will, of course, be no increase in the filtering resistance. However, the speed of the exhaust gas within the dust collector must be reduced in order to allow the particles to be collected, and this will increase the installation cost. For instance, in order to keep a dust regulation value of 10 mg/Nm$^3$ or less, the gas speed within the electrostatic precipitator must be 0.3 m/sec or less. Consequently, it has not been economical to use an electrostatic precipitator or a bag filter individually in order to maintain the dust regulation value for the atmosphere release. A combination of wet scrubbers, electrostatic precipitators, bag filters, etc. has generally been proposed as a dust collector, but these proposals have been concerned with a simple combination thereof, without considering the features of the produced particles.

SUMMARY OF THE INVENTION

It is an object of the present invention to provide a method of treating an exhaust gas containing noxious ingredients such as $SO_x$ and/or $NO_x$ comprising the steps of irradiating the exhaust gas with ionizing radiation or ultraviolet light in the presence of ammonia to produce solid particles, treating the same first by utilizing an electrostatic precipitator and then further treating the same by utilizing a mechanical filter, whereby the treated effluent gas released into the atmosphere satisfies the relevant dust regulation level in addition to being substantially free of $SO_x$ and $NO_x$.

Other objects and advantages of this invention will become apparent to those skilled in the art from the following description and drawings.

DESCRIPTION OF THE PREFERRED EMBODIMENTS

Figure 1:
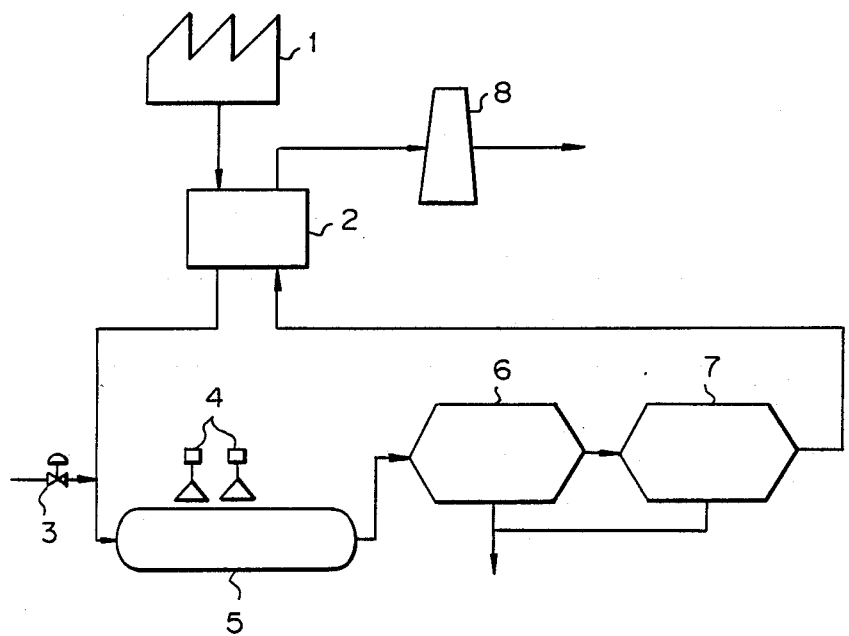
FIG. 1 illustrates a schematic view of the present invention.

The present invention is hereinafter explained with reference to FIG. 1.

An exhaust gas generated by a boiler 1 and containing $SO_x$ and/or $NO_x$ is cooled down by a cooling tower or a heat exchanger 2, injected with a necessary quantity of ammonia from an ammonia feed pipe 3, and fed into a reactor 5 where the exhaust gas is irradiated with an electron beam from an electron beam accelerator or by another form of radiation from a UV radiation source 4. $SO_x$ and/or $NO_x$ contained in the exhaust gas are converted into solid particles, mainly of ammonium sulphate and/or ammonium nitrate, which in turn are fed firstly into an electrostatic precipitator 6 and secondly into a mechanical filter apparatus 7, in order to allow the solid particles and remaining unreacted ingredients to be collected. The exhaust gas is released to the atmosphere from a smokestack 8 through a heat exchanger 2.

One of the features of the present invention is the process used to produce solid particles of mainly ammonium sulphate and/or ammonium nitrate by an irradiation treatment of an exhaust gas containing noxious ingredients such as $SO_x$ and/or $NO_x$ in the presence of ammonia and, as to this method, well known prior art methods can be used.

The solid particles produced by irradiating an exhaust gas containing noxious ingredients such as $SO_x$ and/or $NO_x$ with ionizing radiation or ultraviolet light in the presence of ammonia are very small particles having a high degree of adhesivity and hygroscopicity. However, in order to collect such small particles solely by using an electrostatic precipitator so that the exhaust gas meets the requiste dust regulation values, the gas flow speed within the electrostatic precipitator should be kept very low, such as 0.3 m/sec and, therefore, a large electrostatic precipitator is required.

On the other hand, if the solid particles are to be collected solely by using a mechanical filter such as a bag filter, as mentioned above, when the quantity of the particles is large, a large filtering area is needed since filtering resistance increases in a short period of time due to the adhesivity of the particles or the fact that the particles tend to grow while condensing.

In the present invention, since a mechanical filter is provided downstream of an electrostatic precipitator, a high gas flow speed of 0.5–3 m/sec and a residence time of 4–15 seconds within the electrostatic precipitator can be utilized so that fine particles (mainly less than 1.0 μm) will coalesce and grow to about 5–10 μm and the filter resistance (pressure loss) of the mechanical filter will not increase during a short period of time due to the coalescence and growth of the particles within the electrostatic precipitator and the small quantity of particles supplied thereto, thereby avoiding the need for a large filtering area.

As to the mechanical filter, either a bag filter or a membrane filter or others can be used; however, a bag filter is preferable from the viewpoint of the potential for reuse. As to the filtering speed, in a case where the solid particle concentration is 0.1–1 $g/m^3$ at the entrance of the bag filter, it will be 0.5–2 m/min (=1.7–6.7 ft/min), while in a case where the concentration is 5–10 $g/m^3$, it will be 0.3–0.5 m/min (=1–1.7 ft/min).

As mentioned above, in the present invention, the gas flow speed in the electrostatic precipitator can be maintained at about 0.5–3 m/sec, which is about 1.7–10 times higher than that of the prior art method where an electrostatic precipitator alone is used. Therefore, the size of the electrostatic precipitator can be reduced by about two-thirds or less, thereby enabling the collector to be built within the casing of a mechanical filter.

In an ordinary electrostatic precipitator, a pressure drop of several $mmH_2O$ is provided at its outlet to rectify the gas flow. However, in a bag filter, the pressure drop, namely $\Delta P$, at the filtering surface is as much as 100–150 $mmH_2O$. Therefore, where an electrostatic precipitator is provided within a filter bag, such a rectifier can be eliminated. In other words, a more simple electrostatic precipitator can be used.

The present invention will be described below by way of Examples. However, the present invention is in no way restricted by these Examples.

The main items of the specification of the electrostatic precipitator and mechanical filter (bag filter) used in Examples 1 and 2 and Comparative Example 1 are as follows:

| Electrostatic Precipitator (ESP) | |
| --- | --- |
| Type | Trailer-Mounted Mobile ESP |
| Number of Field | 4 |
| Type of Electrode | Plate Electrode with Needle Discharge |
| Eff. Cross-sectional Area | 27.08 Sq. Ft. |
| Total Plate Area | 659.5 Sq. Ft. per Field |
| Electrode Spacing | 6.30" |
| Bag Filter | |
| Type | Pulse Clean Fabric Filter |
| Number of Module | 3 |
| Number of Bags | 360 (120/module) |
| Gross Filter Area | 6570 Sq. Ft. |
| Air-to-Cloth Ratio | 2.89 at 12.642 ACFM |
| Bag Material | Acrylic Singed |
| Cleaning Method | On-Line or Off-Line |

EXAMPLE 1

An exhaust gas in a quantity of about 7000 $m^3/h$ containing $SO_x$ in an amount of 1405 ppm and $NO_x$ in an amount of 271 ppm was treated by electron beam radiation (1.8 Mrad) in the presence of 3080 ppm $NH_3$ with a reactor exit temperature of 60°–80° C. and was fed into an electrostatic precipitator (ESP) and a bag filter in that order. The gas flow speed was 1.1 m/sec and the residence time 4.5 sec within the ESP, and the gas flow speed was 0.5 m/min within the bag filter. The initial exhaust gas, the results of the treatment of the exhaust gas at the exit of the bag filter and the like are shown in Table 1.

TABLE 1

| | Exhaust gas condition | Ammonia addition quantity | Un-reacted gas and dust collected | |
|---|---|---|---|---|
| | | | At exit of ESP | At exit of bag filter |
| $SO_2$ | 1045 ppm | | 157 ppm | 17 ppm (desulphurization efficiency 98.8%) |
| $NO_x$ | 271 ppm | | | 54 ppm (denitration efficiency 80%) |
| $NH_3$ | | 3080 ppm | 473 ppm | 9 ppm |
| Dust | | | about 300 mg/Nm$^3$ | 10 mg/Nm$^3$ or less |

Figure 2:
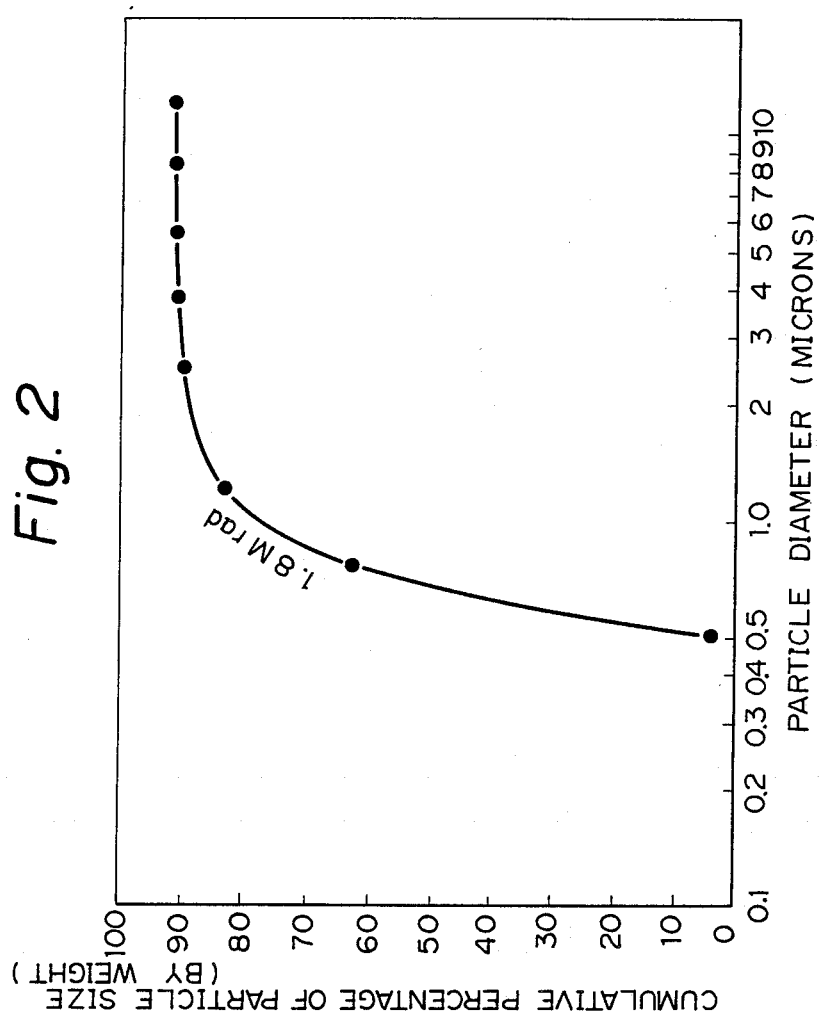
FIG. 2 shows the product particle size distribution at the inlet of the electrostatic precipitator in Example 1.

FIG. 2 shows the product particle size distribution at the inlet of the ESP in Example 1. It is seen from FIG. 2 that particles of not more than 1.0 μm in diameter account for about 78% of the total amount of particles and that the particle size of the product evolved upon electron beam irradiation is extremely small.

Figure 3:
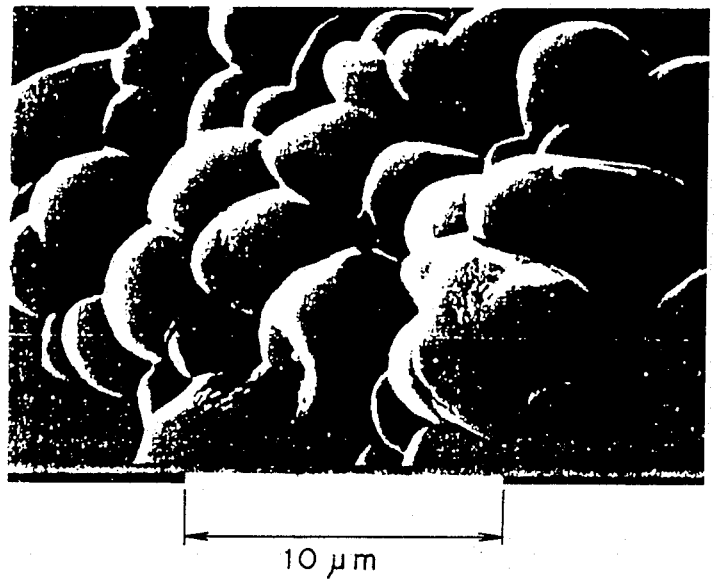
FIG. 3 is a photograph of the product collected at the electrostatic precipitator in Example 1, this photograph having been taken by a scanning electron microscope.

FIG. 3 is a photograph taken by scanning electron microscope (SEM) of the product collected at the ESP in Example 1. From this photograph, the size of the product collected at ESP was found to be in the order of 5 to 10 μm.

Figure 4:
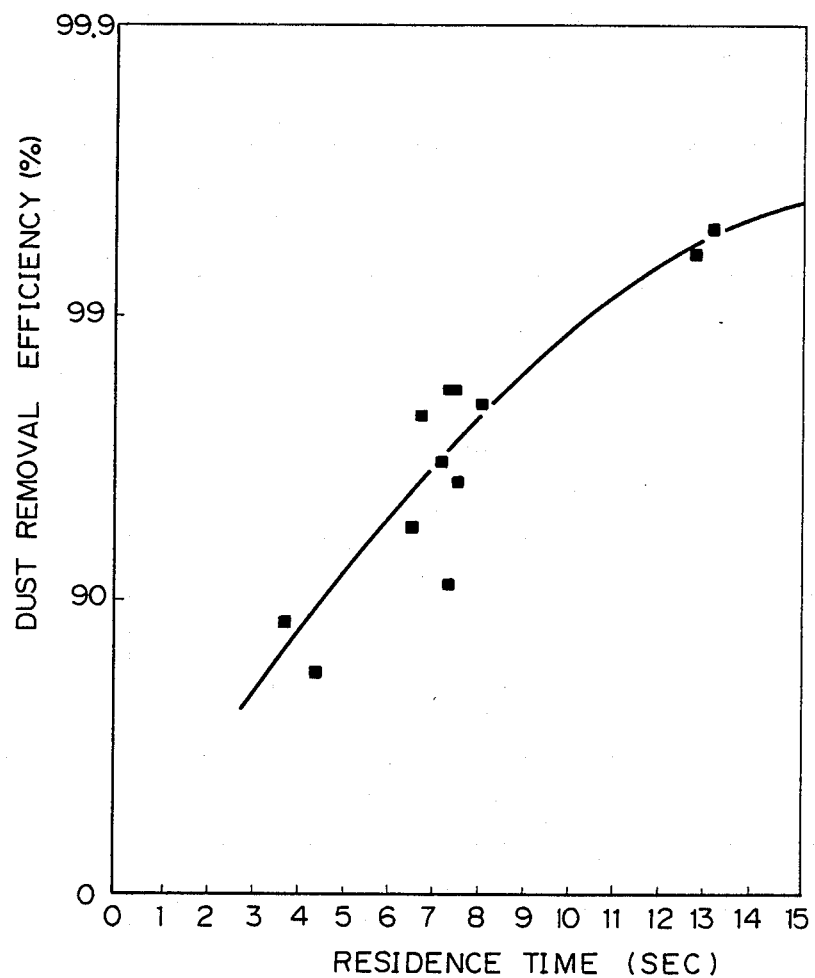
FIG. 4 shows the relationship between dust removing efficiency (%) and residence time of the exhaust gas within the electrostatic precipitator in Example 1.

FIG. 4 shows the relationship between dust removing efficiency (%) and residence time of the exhaust gas within the ESP in Example 1. FIG. 4 reveals that, by treating the exhaust gas within the ESP for at least 4 seconds or more of the residence time, fine particles produced by irradiation are mutually adhered and agglomerated, thereby increasing the dust removing efficiency.

COMPARATIVE EXAMPLE 1

Figure 5:
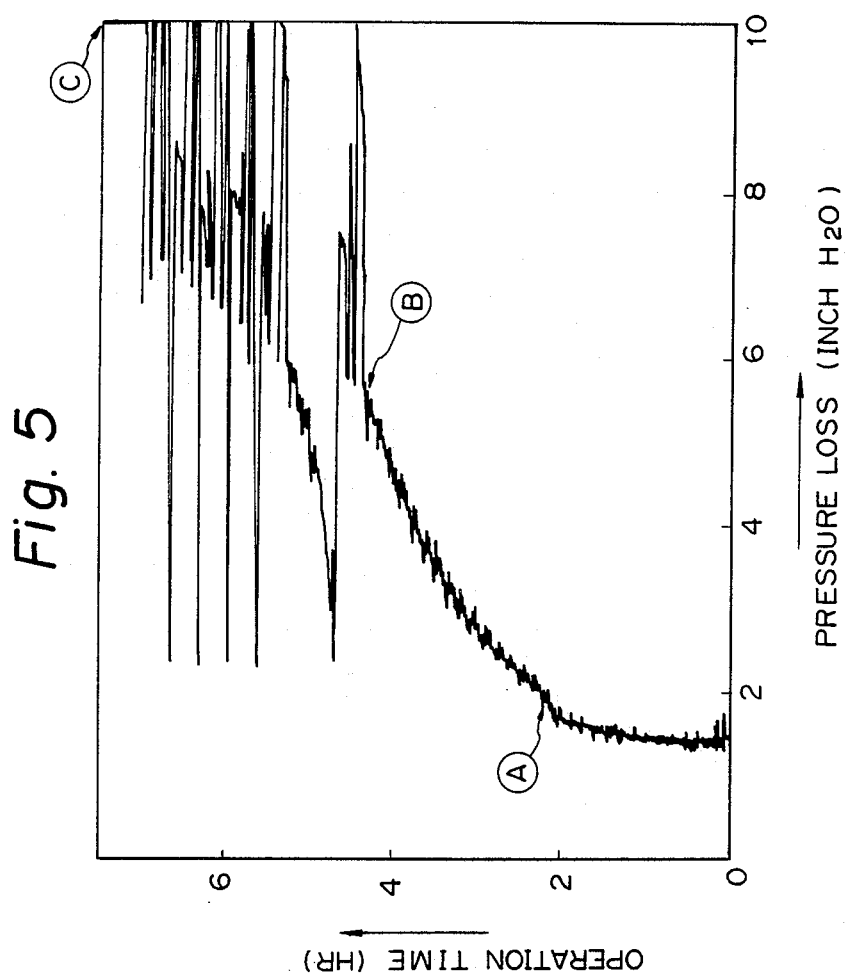
FIG. 5 shows the relationship between the pressure loss and the operation time within the bag filter used in Comparative Example 1.

A test was carried out which was substantially the same as that of Example 1, except that a bag filter alone was used as the collecting device. The increase in pressure loss is shown in FIG. 5. The increase in the pressure loss in the bag filter was as high as 4 inches (water) after 2 hours (mark B) from the initiating (mark A) of the operation, and when the pressure loss became 4 inches (water) the sweeping-away of the collected dust was carried out by ordinary pulse air. It was found that even with this sweeping-away with pulse air, the pressure loss was not recovered and became 8 inches (water) 5.5 hours (mark C) from the initiation so that inevitably the test was stopped. Thus with the bag filter alone, the pressure loss abruptly increases and it becomes difficult or impossible to perform a stable operation.

EXAMPLE 2

An exhaust gas in a quantity of about 6700 m$^3$/h containing SO$_x$ in an amount of 874 ppm and NO$_x$ in an amount of 234 ppm was treated by electron beam radiation (1.8 Mrad) in the presence of 1982 ppm NH$_3$ with a reactor exit temperature of 60°–80° C. and was fed into an electrostatic precipitator (ESP) and a bag filter in that order. The gas flow speed was 1.05 m/sec and the residence time within the ESP 4.7 second, while the gas flow speed within the bag filter was 0.52 m/min. The initial exhaust gas, the results of the treatment of the exhaust gas at the exit of the bag filter and the like are shown in Table 2.

TABLE 2

| | Exhaust gas condition | Ammonia addition quantity | Un-reacted gas and dust collected | |
|---|---|---|---|---|
| | | | At exit of ESP | At exit of bag filter |
| $SO_2$ | 874 ppm | | 76 ppm | 12 ppm (desulphurization efficiency 98.6%) |
| $NO_x$ | 234 ppm | | | 23 ppm (denitration efficiency 90%) |
| $NH_3$ | | 1982 ppm | 343 ppm | 2 ppm |
| Dust | | | 100 mg/Nm$^3$ or more | 10 mg/Nm$^3$ or less |

From the relationship between the concentration of SO$_2$ and NH$_3$ at the exit of the electrostatic precipitator and that of SO$_2$ and NH$_3$ at the exit of the bag filter, it is seen that the reaction of SO$_2$ and NH$_3$ occurred in the bag filter and these noxious ingredients are thus removed more completely. This is a surprising result. This is understood to be because the solid particles collected in the bag filter effectively absorb the non-reacted SO$_2$ and NH$_3$ and reaction of SO$_2$ and NH$_3$ is enhanced by utilizing the solid particles.

What is claimed is:

1. A process of purifying an exhaust gas containing at least one of SO$_x$ and NO$_x$ ingredients which comprises:
    admixing such gas with ammonia;
    irradiating said mixture with ionizing radiation or ultraviolet light, whereby producing a resultant gas containing fine particulate products;
    passing said resultant gas through an electrostatic precipitator at a gas flow speed of about 0.5 to 3 m/sec. with a residence time of about 4 to 15 seconds, whereby causing said fine particles to coalesce into particles of about 5 to 10 μm;
    removing a major part of said coalesced particles from said electrostatic precipitator;
    passing gas containing particles discharged from said electrostatic precipitator into a mechanical filter at a speed of about 0.3 to 3 m/min., whereby reacting residual non-reacted ingredients with residual ammonia to produce additional particles;
    removing particles from said gas stream by said filter; and
    releasing the gas, containing a reduced particle content, leaving said mechanical filter to the atmosphere.

2. A process as claimed in claim 1 wherein said gas flows through said electrostatic precipitator at a speed of about 1 to 2 m/sec with a residence time of about 4 to 5 seconds, and wherein said gas flows into said mechanical filter at a speed of about 0.5 to 0.6 m/sec.

3. A process as claimed in claim 1 wherein said mechanical filter is a bag filter.

* * * * *